(12) United States Patent
Haddadin et al.

(10) Patent No.: US 11,473,629 B2
(45) Date of Patent: Oct. 18, 2022

(54) CONNECTION ASSEMBLY OF A TRANSMISSION IN A STRUCTURE

(71) Applicant: FRANKA EMIKA GmbH, Munich (DE)

(72) Inventors: Sami Haddadin, Hannover (DE); Tim Rokahr, Munich (DE); Johannes Schmid, Munich (DE)

(73) Assignee: FRANKA EMIKA GMBH, Munich (DE)

( * ) Notice: Subject to any disclaimer, the term of this patent is extended or adjusted under 35 U.S.C. 154(b) by 1252 days.

(21) Appl. No.: 15/752,691

(22) PCT Filed: Aug. 12, 2016

(86) PCT No.: PCT/EP2016/069266
§ 371 (c)(1),
(2) Date: Nov. 15, 2018

(87) PCT Pub. No.: WO2017/029228
PCT Pub. Date: Feb. 23, 2017

(65) Prior Publication Data
US 2019/0154086 A1 May 23, 2019

(30) Foreign Application Priority Data
Aug. 14, 2015 (DE) ...................... 10 2015 113 488.8

(51) Int. Cl.
*F16D 1/08* (2006.01)
*F16D 7/02* (2006.01)

(52) U.S. Cl.
CPC ........... *F16D 1/0835* (2013.01); *F16D 7/021* (2013.01)

(58) Field of Classification Search
CPC ... B25J 17/00; B25J 17/02; B25J 18/00; B25J 18/002; F16D 1/0829; F16D 1/0835;
(Continued)

(56) References Cited

U.S. PATENT DOCUMENTS

| 3,838,928 A | 10/1974 | Blaurock et al. |
| 4,222,246 A | 9/1980 | Rongley |
| 5,059,042 A * | 10/1991 | Grierson ................ F16C 27/04 384/537 |

(Continued)

FOREIGN PATENT DOCUMENTS

| CN | 104350299 A | 2/2015 |
| DE | 696 09 120 T2 | 11/2000 |

(Continued)

OTHER PUBLICATIONS

Second examination report (issued in parallel Japanese case), 3 pages; JP 2018-509604; dated Dec. 3, 2019 (no English language version available but all of the references cited therein have been or are being provided in this IDS).

(Continued)

*Primary Examiner* — Josh Skroupa
(74) *Attorney, Agent, or Firm* — Todd A. Serbin; Nexsen Pruet, LLC

(57) ABSTRACT

A connection assembly between a drive-side structure and a transmission outer ring sealing a transmission arranged radially inside, wherein an annular chamber comprising a connection element arranged therein is configured between the transmission outer ring and the drive-side structure, and a peripheral guide is axially configured at least on one side of the annular chamber between the transmission outer ring and the drive-side structure, wherein the connection element comprises bulges which are spaced over the peripheral extension and are elastically deformable and forms a force-fit connection between the transmission outer ring and the drive-side structure when the bulges elastically deform.

19 Claims, 3 Drawing Sheets

(58) Field of Classification Search
CPC . F16D 7/02; F16D 7/021; F16D 7/022; Y10T 403/7047; Y10T 403/7058; Y10T 403/7061
USPC .......................................... 403/365, 371, 372
See application file for complete search history.

(56) References Cited

U.S. PATENT DOCUMENTS

| | | | | |
|---|---|---|---|---|
| 6,378,678 | B1* | 4/2002 | Armitage | F16D 7/021 464/41 |
| 6,854,556 | B1* | 2/2005 | Yamamoto | F16D 7/021 180/443 |
| 7,658,677 | B2* | 2/2010 | Needes | F16D 7/021 464/30 |
| 8,385,024 | B2* | 2/2013 | Schmidt | F16D 1/0835 403/371 |
| 9,115,763 | B2* | 8/2015 | Hagan | F16D 7/021 |
| 9,869,330 | B2* | 1/2018 | Kinoshita | F16D 1/0835 |
| 10,125,854 | B2* | 11/2018 | Lingren | F16D 7/021 |
| 10,371,213 | B2* | 8/2019 | Slayne | F16D 7/021 |
| 10,704,608 | B2* | 7/2020 | Nakamura | F16D 7/021 |
| 2005/0077101 | A1 | 4/2005 | Yamamoto et al. | |

FOREIGN PATENT DOCUMENTS

| | | | | |
|---|---|---|---|---|
| DE | 203 19 969 U1 | | 3/2004 | |
| DE | 10 2005 027 290 A1 | | 12/2006 | |
| EP | 0741067 A1 | | 6/1996 | |
| EP | 2 666 595 A1 | | 11/2013 | |
| JP | 1997020256 A | | 1/1997 | |
| JP | H0920256 A | | 1/1997 | |
| JP | 10100912 A | * | 4/1998 | ............... B62D 5/04 |
| JP | 2001159429 A | | 6/2001 | |
| JP | 2002519600 A | | 7/2002 | |
| JP | 2015-523514 A | | 8/2015 | |
| WO | 0000755 A1 | | 1/2000 | |
| WO | 2014001818 A1 | | 1/2014 | |

OTHER PUBLICATIONS

Ekim, Chang-Ho; "Summary on the Office Action: Result of Examination", 10-2018-7007406, Korean Examination Bureau, dated Apr. 23, 2019.
Weißenbach, Dr. Gerd; German Examination Report; 7 pages; DE 10 2015 113 488.8; dated Apr. 28, 2016.
Arboreanu, Antoniu; International Search Report; 4 pages; PCT/EP2016/069266; dated Nov. 25, 2016.
First examination report includes English translation (issued in parallel Chinese case), 13 pages; CN201680048421.9 dated Mar. 19, 2020.
Tung, Dr. Patrick; Written Opinion; Intellectual Property Office of Singapore; 6 pages; 11201801056U; dated Jun. 28, 2018.

* cited by examiner

CONNECTION ASSEMBLY OF A TRANSMISSION IN A STRUCTURE

RELATED APPLICATIONS

This application is a U.S. national phase application, claiming priority under 35 U.S.C. 371 to PCT application PCT/EP2016/069266, filed on Aug. 12, 2016, claiming priority to German national application 10 2015 113 488.8, filed on Aug. 14, 2015, the contents of the these applications incorporated by reference as if fully set forth herein in their entirety.

FIELD AND BACKGROUND OF THE INVENTION

From DE 10 2005 027 290 A1, an embodiment of a connection assembly is known.

DETAILED DESCRIPTION OF EMBODIMENTS OF THE INVENTION

Figure 1:
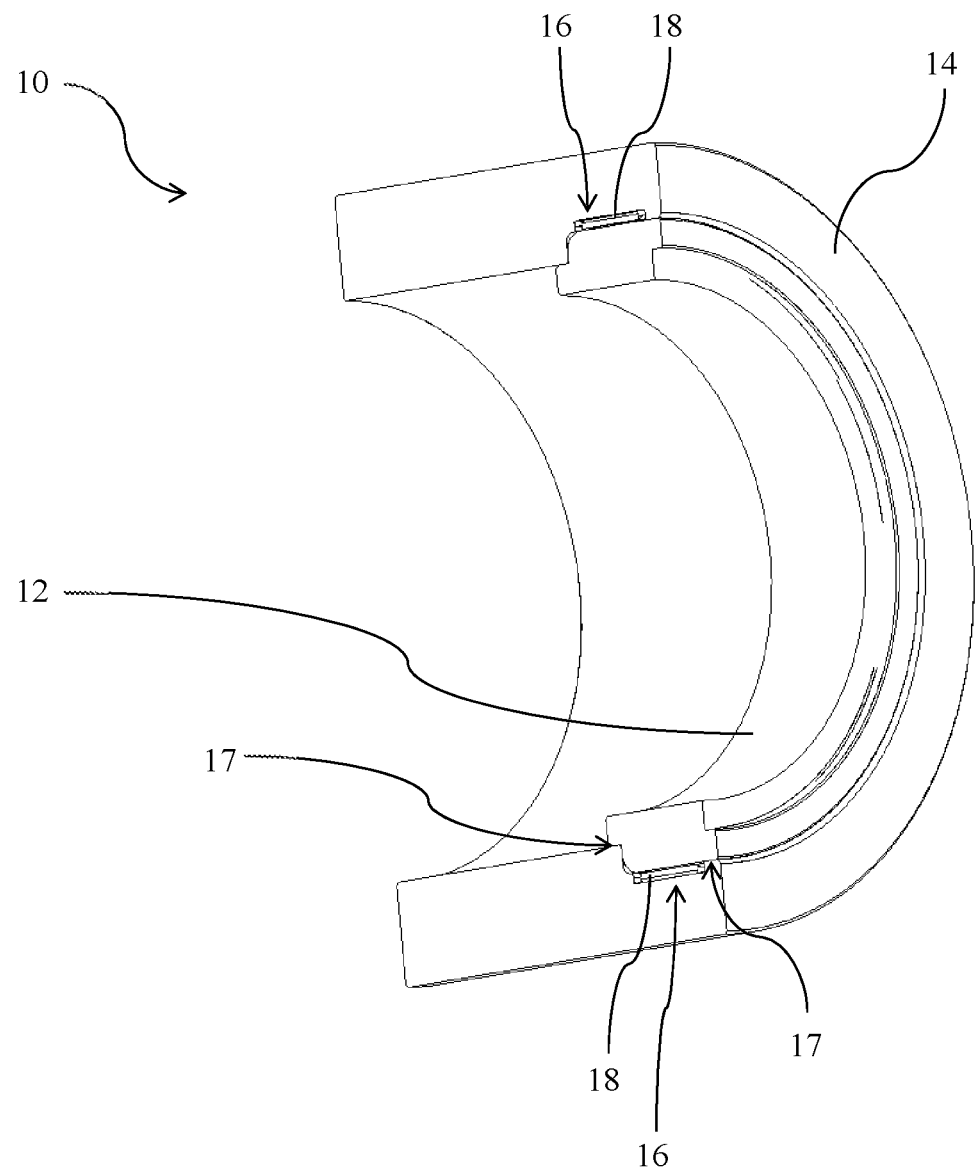
FIG. 1 is a representation of an exemplary embodiment of the recommended connection assembly in longitudinal section, FIG. 2 a detail view of the connection assembly of FIG. 1, and FIG. 3 an exemplary embodiment of a connection element.

The problem of the invention is to provide a connection assembly between a drive-side structure and a transmission outer ring sealing a transmission arranged radially inside, which in particular enables a simple, rapid, more economical, and centered installation of a transmission outer ring in the structure.

The invention relates to a connection assembly between a drive-side structure and a transmission outer ring sealing a structure arranged radially inside. The transmission is connectable on the drive-side on a drive and on the driven-side by a drive shaft. The recommended connection assembly can be used in many fields of machine building, especially in robotics.

The invention follows from the features of the independent claims. Further advantageous embodiments and designs are the subject matter of dependent claims. Further features, application possibilities, and advantages of the invention follow from the following description, as well as the explanation of the exemplary embodiments of the invention, which are represented in the figures.

A first aspect of the problem is solved by a connection assembly between a drive-side structure and a transmission outer ring sealing a transmission arranged radially inside, wherein between the transmission outer ring and the drive-side structure there is an annular space formed with a connection assembly, and axially at least on one side of the annular space there is a peripheral guide between the transmission outer ring and the drive-side structure.

The connection element according to the invention has bulges that are spaced over the peripheral extension and are elastically deformable, and forms a force-fit connection between the transmission outer ring and the drive-side structure when the bulges elastically deform. Preferably the bulges are distributed uniformly over the peripheral extent of the connection assembly.

The connection assembly radially distributes the arising forces largely uniformly over the bulges over the periphery of the transmission outer ring. The connection assembly further compensates to the greatest extent the arising different heat-induced material extensions of the transmission outer ring and the drive-side structure. A mechanical overload of the transmission is ruled out due to the force-fit connection between the transmission outer ring and the drive-side structure. For this purpose, the connection element (shape and material property) as well as the annular space (shape) must be suitably chosen so that starting with a predetermined torque, sliding of the transmission outer ring occurs in the drive-side structure.

Here on both sides of the annular space, on the drive-side structure, a peripheral guide is formed, which radially guides the transmission outer ring. Advantageously, both peripheral guides of the structure are radially spaced differently with respect to a longitudinal axis of the annular peripheral guides, so that a separation exists wherein the transmission outer ring is formed to be complementary to the radially spaced peripheral guides, i.e. likewise it has two peripheral surfaces which are radially spaced differently with respect to the longitudinal axis of the transmission outer ring, i.e. here likewise there is a separation. This brings about an at least two-stage guide of the transmission outer ring. In this way the weight of the connection assembly can be reduced, which above all permits lightweight devices. In the region of the recess on the drive-side structure, advantageously there is a chamfered insertion section. Due to the chamfered recess, when the transmission outer ring is pressed into the drive-side structure, the connection assembly is not damaged.

Advantageously the transmission may be connected on the drive side to a drive, an electric motor, hydraulic motor etc., and on the driven side for example to the driven mechanics. The corresponding connection assembly with drive and driven element are to be selected for example in a housing as needed. The transmission is advantageously a shaft transmission or a cycloid transmission or a galaxy transmission or a planet transmission.

The force-fit connection is designed for a static friction that may be set according to need. This means that only when a predetermined torque is exceeded, may a slide or rotational movement of the transmission outer ring occur on the drive-side structure about the longitudinal axis of the transmission outer ring.

The recommended connection assembly may be used to particular advantage in a robot arm, wherein the mechanical integration of the transmission outer ring in the robot arm is considerably facilitated in comparison with the prior art. The connections of gears in robot arms used to date in robotics for this purpose are screw connections, as the transmission types used in robotics (for example shaft transmissions) are available solely as screwable variants in the market. On the other hand, the used transmission types, owing to the high demands on dimensional stability, exert extremely small influences from radial forces. While axial screw attachment of a transmission applies hardly any forces in the radiation direction, even the slightest tolerance deviations in the components upon compression of a transmission outer ring provoke significant effects on the pairing of the utilized transmission parts with one another. For this reason, transmissions are not press-fitted at present, but screwed together. The recommended connection assembly, in comparison with the connections used in the prior art, has a lower weight. Furthermore, the recommended connection assembly also provides a more compact design of a robot arm, which makes possible improved dynamics and sensitivity of the robot arm. In addition, the scalability of the recommended connection assembly is improved in comparison with the prior art, as with size reduction of the screw connections used in the prior art, or in the screws that are used, the stability of the connection diminishes. The recommended connection assembly further provides greater sturdiness. Since with the recommended connection assembly, in addition fewer parts are used for connection/integration of transmissions in a robot arm, in the end the error susceptibility and wear and tear are reduced.

Advantageously, the drive-side structure has an axial guide of the transmission outer ring such that a motion along a longitudinal axis of the peripheral guides is impeded.

Advantageously, the annular space is configured as a peripheral-side recess in the drive-side structure. Alternatively, the annular space is configured as a peripheral-side recess in the transmission outer ring.

The connection assembly advantageously has in the non-installed state a thickness that is greater than the depth of the annular space, so that the connection assembly incorporated in the annular space radially surmounts the annular space (when the transmission outer ring is not installed). The chamfered insertion segment of the transmission outer ring (see above) facilitates an axial insertion of the transmission outer ring in the structure in which a connection element surmounting the annular space is already arranged in the annular space. The chamfered insertion segment presses the connection element surmounting the annular space upon axial insertion of the transmission outer ring continuously into the annular space, so that no snagging occurs.

Advantageously a recess is formed on the transmission outer ring for centering of a drive-side bearing flange. The recess is used in particular for guiding a drive-side bearing flange.

A connection element advantageously has elastic properties. Advantageously the connection element is configured in a band-like shape as a closed or open band with spaced-apart radially extended bulges. Advantageously all the bulges extend along the band radially outward with respect to an installed state of the band in the annular space and a longitudinal axis of the annular space.

Advantageously the bulges are arranged with equal distribution along the band or only in sub-regions of the band. Advantageously the bulges are arranged in sub-ranges of the band which in each case lie radially opposite in the installed state of the connection element. Advantageously the bulges extend over a sub-region of the connection element. Advantageously the bulges are configured in an arc shape.

In a further development of the connection assembly, the connection element is formed in the peripheral direction in a wave-like or jagged configuration. Furthermore, advantageously the connection element is configured as an open or closed ring.

Advantageously, for the connection assembly interchangeable connection elements of diverse geometries and/or materials can be mounted for setting different sliding torques between the transmission outer ring and the drive housing. In this way, the same connection assembly can be configured for different operating scenarios.

The dimensioning of the transmission outer ring for example as regards its thickness, geometric design, or material is selected depending on the specific operating use and on the configuration of the drive-side structure advantageously such that a mechanical deformation of the transmission outer ring by forces operating radially over the connection element is ruled out or at least ruled out to the extent possible.

A further aspect of the invention relates to a robot joint unit or a robot arm with one or several connection assemblies as were described above.

Further advantages, features, and details may be found from the following description in the-optionally with reference to the drawing-at least one exemplary embodiment in detail. The same, similar, and/or equally functioning parts are marked with the same reference symbols.

FIG. 1 shows a schematic representation of an exemplary embodiment of the recommended connection assembly 10 between a drive-side structure 14 and a transmission outer ring 12 sealing a transmission radially arranged inside. The drive-side structure 14 is presently designed as a hollow element. Between the transmission outer ring 12 and the drive-side structure 14 there is an annular space 16 with a connection element 18 arranged inside. The annular space 16 is configured as a peripheral-side depression in the drive-side structure 14. The connection element 18 has elastic properties, is made of spring steel, and is configured as a open band having spaced, radially extending bulges 26 (cf. FIG. 3). Under elastic deformation of the bulges 26, a force-fit connection is formed between the transmission outer ring 12 and the drive-side structure 14. The bulges 26 along the band presently all extend radially inward with respect to a mounted state of the connection element 18 in the annular space 16 and a central axis (not shown) of the connection assembly 10. The connection assembly further has axially and bilaterally to the annular space 16 peripheral guides 17 between the transmission outer ring 12 and the drive-side structure 14.

Figure 2:
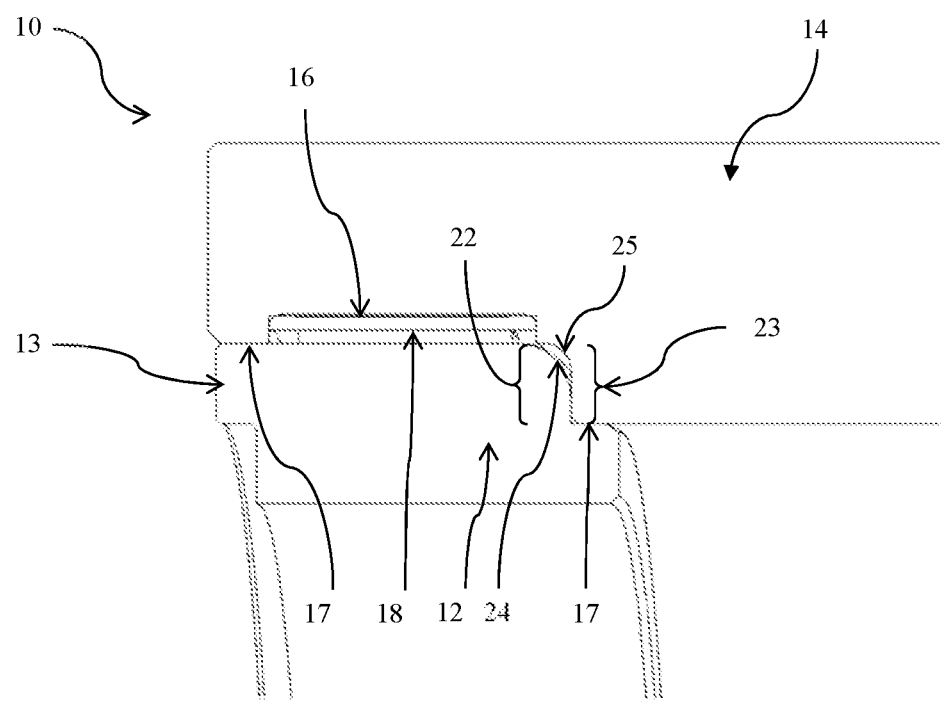

FIG. 2 shows a detail view of the connection assembly 10 from FIG. 1, to which reference is made. It should be noted that bilaterally to the annular space 16, a peripheral guide 17 is configured on both sides, that the annular space 16 is configured as a peripheral-side recess in the drive-side structure 14, and further, that between the two peripheral guides 17 and the transmission outer ring 12 a recess 22 is formed, wherein in the region of the recess 22, a chamfered insertion section 24 is configured. The recess thus effects a two-stage guide. As a complement to this, on the drive-side structure 14 a recess 23 is configured, wherein a chamfered insertion section 25 is configured in the region of the recess.

Figure 3:
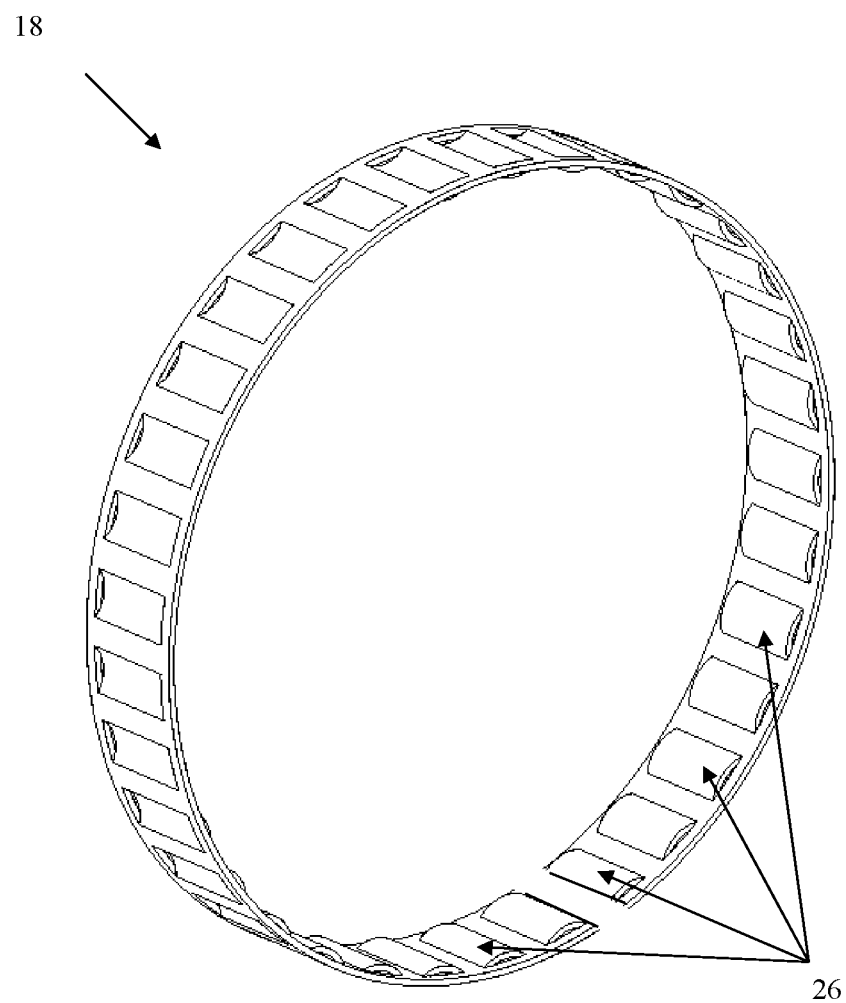

FIG. 3 shows an exemplary embodiment of a connection element 18 according to the invention. The connection element 18 is configured as an open band of an elastic material. Along the inner band surface, the connection element 18 has bulges directed inward.

Although the invention in detail is illustrated and explained by preferred exemplary embodiments, the invention is not limited by the disclosed examples, and other variations can be derived therefrom by a person skilled in the art without departing from the scope of protection of the invention. It is therefore clear that a plurality of variation possibilities exists. It is likewise clear that for example the named embodiments in fact only show examples that are not in any way to be understood as a limitation for example of the scope of protection, application options, or the configuration of the invention. Rather, the present description and the figure description enable a person skilled in the art to specifically implement the exemplary embodiments, wherein a person skilled in the art with knowledge of the disclosed invention concept can undertake numerous changes for example regarding the function or the arrangement of individual elements named in an exemplary embodiment without departing from the scope of protection, which is defined by the claims and their statutory counterparts, as for example the further explanation in the description.

The invention claimed is:

1. A connection assembly between a drive-side structure and a transmission outer ring sealing a transmission arranged radially inside, comprising:
   a first peripheral guide configured axially between the transmission outer ring and the drive-side structure, disposed on a first side of and radially inward of an annular space and having a first radius;
   a second peripheral guide configured axially between the transmission outer ring and the drive-side structure, disposed on a second side of and radially inward of the annular space and having a second radius smaller than the first radius;
   a connection element having elastically deformable bulges spaced over the peripheral extension, wherein under elastic deformation of the bulges, the connection forms a force-fit connection between the transmission outer ring and the drive-side structure,
   wherein the annular space is located between the transmission outer ring and the drive-side structure with the connection element disposed therein, and
   wherein at least one recess is configured to extend radially inward from the drive-side structure and is disposed between the annular space and the second peripheral guide.

2. The connection assembly according to claim 1, characterized in that the annular space is configured as a peripheral-side recess in the drive-side structure.

3. The connection assembly according to claim 2, characterized in that on the transmission outer ring, a recess is configured for centering of a drive-side bearing flange.

4. The connection assembly according to claim 2, characterized in that the connection element is defined to be band-like with spaced-apart radially extended bulges.

5. The connection assembly according to claim 1, characterized in that the annular space is configured as a peripheral-side recess in the transmission outer ring.

6. The connection assembly according to claim 5, characterized in that on the transmission outer ring, a recess is configured for centering of a drive-side bearing flange.

7. The connection assembly according to claim 1, characterized in that in a corner of the region of the recess on the drive-side structure, there is a chamfered insertion section.

8. The connection assembly according to claim 7, characterized in that the recess effects at least a two-stage guide of the transmission outer ring.

9. The connection assembly according to claim 8, characterized in that on the transmission outer ring, a recess is configured for centering of a drive-side bearing flange.

10. The connection assembly according to claim 7, characterized in that on the transmission outer ring, a recess is configured for centering of a drive-side bearing flange.

11. The connection assembly according to claim 7, characterized in that the connection element is defined to be band-like with spaced-apart radially extended bulges.

12. The connection assembly according to claim 1, characterized in that on the transmission outer ring, a recess is configured for centering of a drive-side bearing flange.

13. The connection assembly according to claim 1, characterized in that the connection element is defined to be band-like with spaced-apart radially extended bulges.

14. A robot joint unit with a connection element according to claim 1.

15. A robot arm with a connection assembly according to claim 1.

16. The connection element according to claim 1, characterized in that the annular space is configured as a peripheral-side recess in the drive-side structure.

17. The connection assembly according to claim 1, characterized in that the annular space is configured as a peripheral-side recess in the transmission outer ring.

18. The connection assembly according to claim 1, characterized in that on the transmission outer ring, a recess is configured for centering of a drive-side bearing flange.

19. The connection assembly according to claim 1, characterized in that the connection element is defined to be band-like with spaced-apart radially extended bulges.

* * * * *